United States Patent [19]

May

[11] 4,094,272
[45] June 13, 1978

[54] EXTERNALLY IGNITED FOUR CYCLE INTERNAL COMBUSTION ENGINE

[76] Inventor: Michael G. May, Bel Air, CH 1180 Rolle, Switzerland

[21] Appl. No.: 630,624

[22] Filed: Nov. 10, 1975

Related U.S. Application Data

[63] Continuation-in-part of Ser. No. 545,023, Jan. 29, 1975, Pat. No. 4,000,722.

[30] Foreign Application Priority Data

Jan. 24, 1975 Italy .............................. 19596 A/75

[51] Int. Cl.² .............................................. F02B 3/00
[52] U.S. Cl. .............................. 123/30 D; 123/32 L; 123/191 S; 123/32 SP
[58] Field of Search ............... 123/30 D, 30 C, 32 C, 123/32 D, 32 SP, 32 ST, 75 B, 188 M, 191 S, 191 SP, 191 M, DIG. 4

[56] References Cited

U.S. PATENT DOCUMENTS

| | | | |
|---|---|---|---|
| 1,998,708 | 4/1935 | Campell | 123/32 SP |
| 2,652,039 | 9/1953 | Westlake | 123/75 B |
| 2,746,433 | 5/1956 | Nallinger | 123/32 C |
| 2,760,478 | 8/1956 | Boghetto | 123/191 M |
| 2,763,254 | 9/1956 | Klug | 123/191 M |
| 2,799,257 | 7/1957 | Stumpfig et al. | 123/32 SP |
| 2,986,129 | 5/1961 | Henry-Biabaud | 123/191 M |
| 4,000,722 | 1/1977 | May | 123/32 C |

*Primary Examiner*—Charles J. Myhre
*Assistant Examiner*—David D. Reynolds
*Attorney, Agent, or Firm*—Edwin E. Greigg

[57] ABSTRACT

An externally ignited four cycle internal combustion engine equipped with an inlet valve and an outlet valve. In one embodiment a swirl (turbulence or vortex) chamber is provided within the cylinder head, the height of the swirl chamber being less than its maximum diameter. An outlet closable by the outlet valve is located in the upper portion of the swirl chamber. A channel-like recess, which creates a guide channel when the piston is in its top dead center position, terminates approximately tangentially in the swirl chamber. The channel-like recess may be formed in the cylinder head, in the top of the piston or partially in both of these members. In another embodiment, a reduced throat area is adapted to introduce the gases from the first inlet valve chamber to an oval secondary chamber adjacent to the outlet valve.

13 Claims, 4 Drawing Figures

EXTERNALLY IGNITED FOUR CYCLE INTERNAL COMBUSTION ENGINE

CROSS-REFERENCE TO RELATED APPLICATION

This application is a continuation-in-part of applicant's copending application Ser. No. 545,023, filed on Jan. 29, 1975, now U.S. Pat. No. 4,000,722.

BACKGROUND OF THE INVENTION

The invention relates to an externally ignited four cycle internal combustion engine in which the fuel air mixture is formed outside of the at least one cylinder and where each cylinder is provided with at least one dependent outlet valve. The opening to be closed by the outlet valve is disposed in the upper portion of a swirl or turbulence chamber which is located substantially within the cylinder head, wherein the mixture to be combusted is substantially contained when the piston is in its top dead center position, the height of the second chamber being less than its maximum diameter. The lower edge of the turbulence chamber within the cylinder head or of the turbulence chamber region within the cylinder head is located at least substantially within a geometric cylinder surface defined by the track of the piston within the cylinder. A dependent inlet valve is disposed outside of the turbulence chamber and it preferably may be the only inlet valve of any particular cylinder.

In a known internal combustion engine of this type (U.S. Pat. No. 2,763,254) the turbulence chamber is very large and overlaps nearly one-half of the cross section of the interior volume of the cylinder and the outlet valve is located in the cylinder head, as are three spark plugs. The top face of the piston is provided with recesses and a median depression is arranged in such a way that, during the compression stroke, gas flows into the two outer end regions of the turbulence chamber and forms vortices which rotate in mutual symmetry and in the opposite sense. This results in high flow losses, a low thermodynamic degree of efficiency and it also requires the presence of three spark plugs and has further disadvantages.

OBJECT AND SUMMARY OF THE INVENTION

Basic to the invention is the problem to create an engine of the type described above having a high thermodynamic efficiency and all the advantages deriving therefrom and which will provide as complete a combustion as is possible so that this engine, among other things, also expels only a very small amount of noxious exhaust constituents, has a low fuel consumption and further advantages that will become apparent from a perusal of this application.

According to the invention, a channel is provided in the cylinder head of an engine of the above-described type or alternatively the channel may be in the top of the piston all of which is believed to be clear to those skilled in the art from a study of the drawings. When the piston is in the top dead center position, this channel creates a guideway, defined by the cylinder head and by the top of the piston, which terminates in the turbulence chamber in an off-center direction, and preferably approximately in a tangential direction, and which further creates a communication between the interior volume region of the cylinder lying below the valve disc of the inlet valve and the turbulence chamber itself. The guideway or channel terminates in the turbulence chamber in a region adjacent to the inlet valve and it is further provided that the external longitudinal edges of the channel are adjacent to squeezing surfaces (later described herein) within the cylinder head and the top of the piston and further that only one single spark plug is disposed in the wall of the turbulence chamber.

This guideway or channel makes it possible that, toward the end of the compression stroke, practically a single substantial rotational flow takes place in the turbulence chamber, the rotational axis of which is approximately coaxial with the outlet valve. It has been shown that a rapid process of combustion is achieved. Furthermore, the flow losses which occur during the compression stroke and during the expulsion of the combusted mixture, are low.

In addition, the engine may be operated with surprisingly lean fuel-air mixtures. The air surplus of the powering mixture can normally be at least 10%, preferably at least 30%, preferably 30-70%. At least in many cases, it is possible to use mixtures which have an air surplus of at least 40%, preferably at least 50%.

It is further the case that the dispersion of the pressure characteristics in successive cycles is low during steady state operational conditions. The engine has a low fuel consumption, a high specific power and a clean combustion with relatively low concentration of noxious constituents in the exhaust gas. Furthermore, the engine does not tend to "ping," so that it may be operated at relatively high compression ratios, or it may be used with normal fuels at relatively high compressions. The compression ratios can be preferably at least 10:1, or preferably at least 14:1. It is possible in many cases to operate the engine with a compression ratio of more than 15:1 when using fuels with present day octane numbers.

Nevertheless, the engine is inexpensive to manufacture because it does not employ direct fuel injection and it can be embodied with only one inlet valve and one outlet valve for each cylinder. Furthermore, the mass production facilities for four cycle, internal combustion engines without turbulence chambers can be changed over to the manufacture of internal combustion engines according to the invention at relatively low cost since, in the simplest case, only the outlet valve and the cylinder head need to be altered.

It is known that flat head pistons, or pistons having only slightly bulging heads favorably have a minimum heat transfer area. Therefore, it can be suitably provided that the piston used is a flat-head piston or a piston with an only slightly bulging head and that the guide channel and the swirl chamber are provided only in the cylinder head. In addition, this embodiment provides particularly low flow losses.

In order to further improve, i.e., to accelerate the combustion process, it may be suitably provided that, when the piston is in its top dead center position, the preferably at least 80% of the remaining volume of the combustion chamber is formed by the turbulence chamber and by the guide channel.

In general, the fuel mixtures which may be used in the engine can be particularly lean if it is provided that the wall of the turbulence chamber is at least partially uncooled and preferably along its entire circumference in such a way that the wall acquires temperatures of at least 300° C and at most 500°-600° C during partial and full load operation.

BRIEF DESCRIPTION OF THE DRAWING

Corresponding parts carry the same reference numerals in the drawing.

DESCRIPTION OF THE PREFERRED EMBODIMENT

Figure 1:
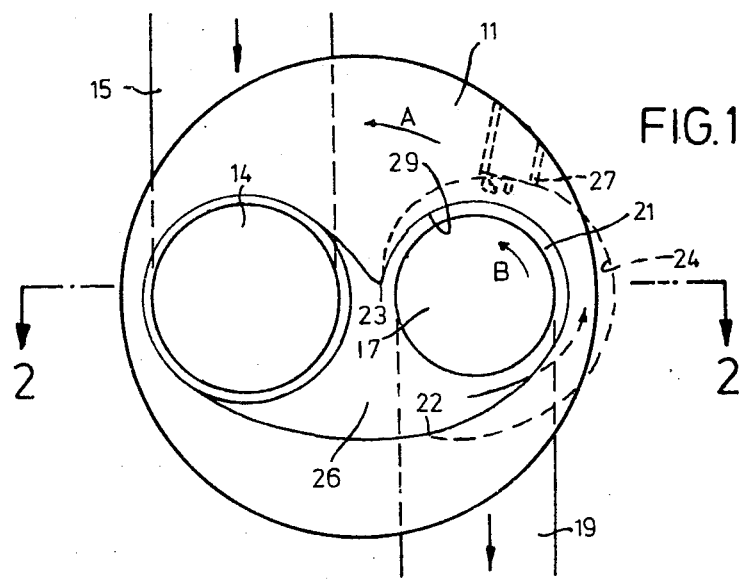
FIG. 1 is a partial, sectional bottom view of the cylinder head of a four-cycle internal combustion engine according to a first exemplary embodiment of the invention and the engine may have other cylinders.
Figure 2:
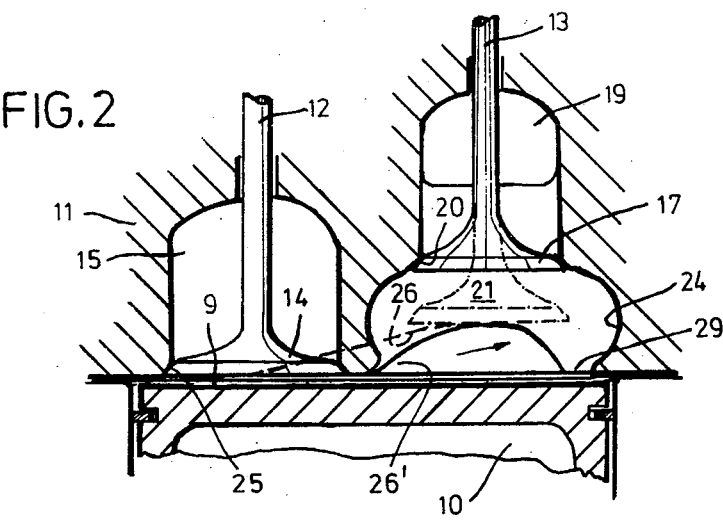
FIG. 2 is a section through FIG. 1 along the section line 2—2 also showing a portion of the cylinder track and the piston.

According to FIG. 2, in this preferred exemplary embodiment, the piston 10 is a flat-head piston, i.e., it has a flat piston-head 9. The cylinder head 11 includes an inlet valve 12 and outlet valve 13. The region of the induction tube 15 leading to the space above the valve disc 14 of inlet valve 12 extends approximately perpendicular to the longitudinal axis of the valve 12, as may be seen in FIG. 1 so that, during the suction stroke of the piston, the gas flowing into the combustion chamber preferably has the direction of the arrow A, i.e., it rotates within the cylinder volume and below the cylinder head 11 in the direction of the arrow A. The exhaust line 19 coming from the space above the valve disc 17 of the outlet valve 13 extends approximately parallel to the induction tube section 15.

The outlet aperture 20 associated with the outlet valve disc 17 is disposed in the top of a turbulence chamber 21 wherein the plane of this outlet aperture 20 is suitably approximately parallel to the top of the piston 9. The circumferential wall 24 of this turbulence chamber 21 is approximately semi-circular in cross section and the radius of this semi-circular cross section is substantially smaller than the maximum diameter of the turbulence chamber 21 so that the turbulence chamber 21 has approximately the shape of an oblate sphere. However, it is preferably provided that it is not an exactly flattened-out sphere but that the distance of the circumferential wall of the turbulence chamber 21 from the central axis of the turbulence chamber 21 (which is coaxial with the longitudinal axis of the outlet valve 13) gets uniformly smaller in the circumferential direction from location 22 up to the location 23 so that this circumferential wall 24 runs approximately spirally in the circumferential direction of the turbulence chamber 21.

It may be seen especially clearly from FIG. 1 that, extending from the cylinder inlet aperture 25, which may be closed off by the inlet valve 12, is a channel formed by a channel-like depression 26 which is provided in the surface of the cylinder head 11 facing the top of the piston 9 and which extends up to the turbulence chamber and whose height according to FIG. 2 continually increases from the inlet aperture 25 up to the turbulence chamber 21.

In the top dead center position of the piston 10 as shown in FIG. 2, this channel 26, together with the top of the piston 9, forms a guide channel 26' which, as may be clearly seen in FIG. 1, terminates approximately tangentially in the circumferential wall 24 of the turbulence chamber 21.

The cross section of this guide channel 26' also continually increases from the inlet valve up to the turbulence chamber due to the continuously increasing height. Its width is approximately constant. The terminus of this cavity 26' nearest the turbulence chamber extends up to nearly half the height of the turbulence chamber 21.

The side of this cavity 26' adjacent to the longitudinal axis of the cylinder terminates at the circumferential wall 24 of the turbulence chamber, in a location 23, in the manner of a break-away edge so that the flow entering the turbulence chamber 21 out of this cavity 26' during the compression stroke will break off. The other side of the cavity 26 continuously extends into the circumferential wall 24 of the turbulence chamber 21 at the location 22.

As may be seen in FIG. 1, the channel 26 is arch-shaped and curved and extends in the direction of the rotational flow generated in the cylinder during the suction stroke (arrow A). This can also be described by saying that, in the view shown in FIG. 1, this channel-like cavity 26' starts at that side of the inlet aperture 25 farthest from the induction tube section 15 and it does so not diametrically opposite this induction tube section but is shifted angularly somewhat in the direction of the turbulence chamber 21. This results in a relatively short length of the guide channel 26' which is favorable.

As may be seen in FIG. 2, the combustion chamber volume remaining when the piston 10 is in its top dead center position is determined substantially only by the guide channel 26' and the turbulence chamber 21.

As has been suggested by broken lines, in the fully open position of the outlet valve 11, the outlet valve disc 17 lies at approximatey the level of the largest diameter of the turbulence chamber 21; i.e., as shown here approximately at half the height of the turbulence chamber and this disposition is generally advantageous.

Suitably, as may be seen in FIG. 2, the single spark plug 27 is inserted in the circumferential wall 24 of the turbulence chamber 21.

The volume of the channel-like cavity 26 is smaller, and preferably substantially smaller than the volume of the turbulence chamber 21.

This turbulence chamber 21 is the only turbulence chamber of this cylinder and the inlet aperture 25 is located a small distance above the top of the piston 9 when the piston is in its top dead center position. This improves the expulsion of combusted gases, among other things. Naturally, however, the distance between the top of the piston 9 and inlet valve disc 14 is sufficiently large that the opening process of the inlet valve 12 may begin in the usual manner before the piston 10 has reached its top dead center position.

It may further be seen from the drawing that the entire lower edge of the lower, relatively large, turbulence chamber opening 29 which is interrupted only by the terminus of the cavity 26, lies opposite the top of the piston 9, so that the flow passage cross section from the cylinder volume region 16, defined by the path of the piston, into the turbulence chamber 21, is not narrowed by the circumference of the cylinder forming the path of the piston and this is especially favorable.

Except for the turbulence chamber 21 and the cavity 26, the remaining region of the cylinder head 11 is so close to the piston 10 in the dead center position of the latter, that a so-called squeezing zone is formed in this entire remaining region.

In addition, the turbulence chamber 21 begins practically immediately at the lower edge of its opening 29 adjacent to the top of the piston 9 so that, in practice, it is immediately adjacent to the cylinder volume.

The following is the method of operation of the sectionally shown cylinder belonging to an externally ignited four-cycle internal combustion engine not shown in further detail and whose fuel-air mixture is produced in any known manner outside of the combustion chamber of the cylinder, for example by means of a carburetor or by fuel injection into the induction tube:

During the suction stroke, and in known manner, the downward motion of the piston aspirates a fuel-air mixture into the combustion chamber while the inlet valve is open and the mixture may swirl within the interior cylindrical volume 16 in the direction of arrow A at least for larger amounts of gaseous mixture. During the subsequent compression motion of the piston 10, this mixture is compressed and a slow rotational flow in the direction of the arrow B may possibly already be formed at this time in the turbulence chamber, conditioned by the channel 26, and the rotational axis of this flow is approximately coaxial with the longitudinal axis of the outlet valve 13. Toward the end of the compressional motion of the piston, the top of the piston 9 comes closer and closer to the cavity 26 so that the flow occurring therein is reinforced and a relatively intensive gas flow takes place from the guide channel 26', being formed, into the turbulence chamber 21, where it generates thereby at least an intensive rotational flow in the direction of the arrow B. The spark plug 27 ignites the mixture in known manner at adjustable crank shaft angles during the compressional motion of the piston, i.e., before the piston has reached its top dead center position.

Due to the concentration of the mixture in the turbulence chamber 21 and in the guide channel 26' and due to the orderly rotational flow prevailing, in the same sense, in the turbulence chamber, the combustion process is rapid and a high degree of fuel utilization is achieved. After the piston has passed its top dead center position, it is pushed downwardly and during the next upward motion of the piston, and while the outlet valve is open, the combusted gas is expelled through the turbulence chamber into the exhaust line 19 and in this process the cavity 26 also improves the expulsion of the the combusted gases.

An engine constructed as described above may be operated with very lean fuel-air mixtures, further it exhibits a low specific fuel consumption and the exhaust gas contains relatively few toxic constituents, so that in spite of its simple construction and its relatively high specific power, it is compatible with the environment. In addition the octane number of the fuel may be relatively low.

As preferably provided in this exemplary embodiment, the cavity 26 is located only in the cylinder head. However, in many cases, it may be suitable to form the guide channel 26' by opposite cavities in the cylinder head and the top of the piston, and it ought to be generally suitable to make the depth of the cavity in the cylinder head greater than the depth of the cavity in the top of the piston. In special cases, it is also conceivable that the guide channel 26' may be formed exclusively by a depression or cavity in the top of the piston which is so shaped that toward the end of the compression stroke of the piston, it introduces gas into the turbulence chamber 10 preferably tangentially, so that the gas executes a rotational flow along the circumferential wall 24 of the turbulence chamber or that at least a substantial component of this rotational flow lies along the circumferential direction of the turbulence chamber.

It is also conceivable to provide a, for example, spherical indentation or depression in the top of the piston opposite the turbulence chamber 21 and the cylinder head 11 where this depression extends the turbulence chamber down into the top of the piston when the piston is in its top dead center position, but where the depth of this depression in the top of the piston can be suitably substantially smaller than the height of the turbulence chamber in the cylinder head so as to limit the thermal loading of the top of the piston.

Figure 4:
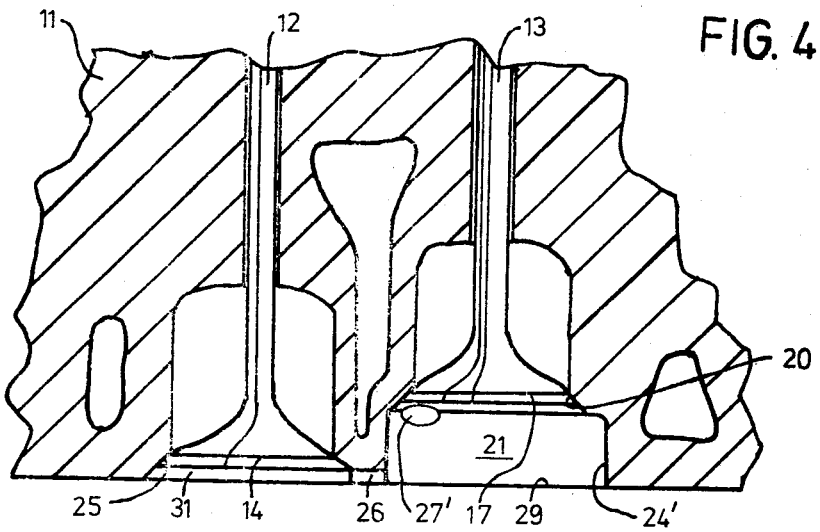
FIG. 4 is a section through FIG. 3 seen along the section line 4-4.
Figure 3:
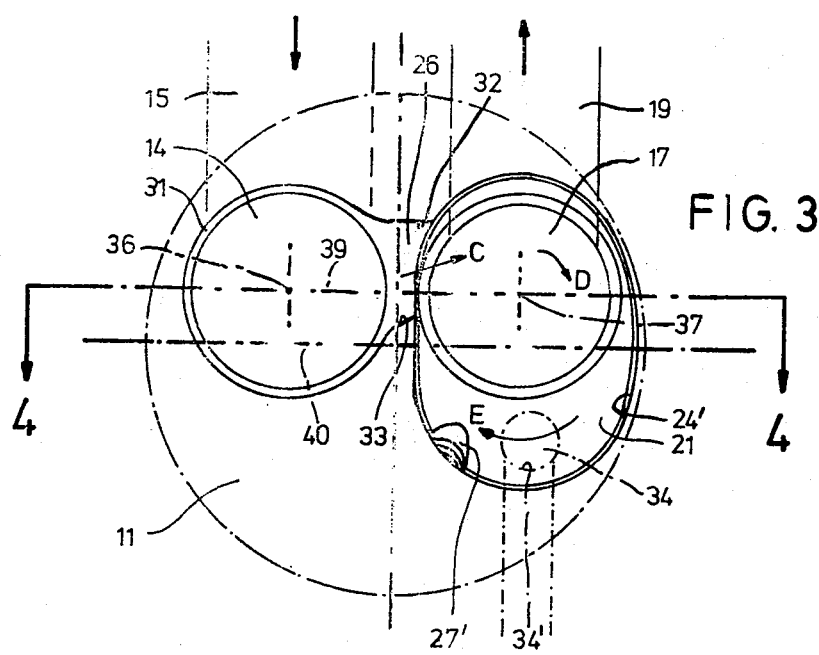
FIG. 3 is a partial sectional bottom view of a cylinder head, similar to that shown in FIG. 1, but according to a second exemplary embodiment of the invention.

The second exemplary embodiment shown in FIGS. 3 and 4 differs from the first exemplary embodiment according to FIGS. 1 and 2 substantially by the disposition of the valves 13 and 14 with respect to the cylinder axis and especially by the embodiment of the turbulence chamber 21 and of the channel 26''. The inlet opening of the interior volume of the cylinder which may be obturated by the inlet valve 12, is located in a shallow frustoconical depression or chamber 31 in the cylinder head 11 whose maximum diameter is somewhat larger than the diameter of the valve disc 14 of the inlet valve 12. As shown, the longitudinal axis 36 of the inlet valve 12 as well as that axis 37 of the outlet valve 13 may be displaced with respect to a diametral plane 40 of the piston which is parallel to their connecting plane 39. In this connection, it is also to be understood that it is a possible feature of the invention that the inlet and outlet valves are so disposed that the line defined by the centers of the valve disc face portions is displaced from, i.e., does not intersect, the central axis of the cylinder or its geometrical extension. In other words, one skilled in this art may construct a cylinder head with valves whose stems are non-parallel, non-vertical and do not lie in the same plane but which still obey the above conditions and thus fall within the scope of this invention. The channel 26'', which leads from the depression or chamber 31 containing the valve disc 14 to the turbulence or second chamber 21 is shown formed by a shallow, broad, channel-like and very short recess in the cylinder head 11 whose cross section may increase or decrease in the direction of the turbulence chamber. This throat area amplifies the impulse of the gas current generated in the channel 26''. This channel is located directly between the inlet opening 25 and the turbulence chamber 21 and is therefore very short. One long edge 32 of the channel 26'' extends substantially parallel to the plane 39 determined by the long axis 36 of the inlet valve 12 as well as the axis 37 of the outlet valve 13, respectively. This imaginary plane 39 passes through the channel 26''. The other long edge 33 of the channel 26'' has a smaller distance from the plane 39 than has the edge 32 and makes an acute angle with the plane 39, such that the cross section of the channel 26'' decreases in the direction of the turbulence chamber 21 and the gas flow is created from the first chamber 31 to the turbulence or second chamber 21 approximately in the direction of the arrow C. The channel 26'', which is open in the direction of the top of the piston over its entire length, and which is asymmetrical with respect to the plane 31 thus terminates in an off-center direction into the turbulence chamber 21 so that the gas flow in the turbulence chamber 21 also flows in an off-center direction according to the arrow C and is formed only toward the end of the compression stroke and thus generates a rotational swirl which flows along the circumferential wall 24' of the turbulence or second chamber 21 according to the arrows D and E. The width of the channel 26" may be subdivided by at least one longitudinal bridge into several, preferably mutually parallel, partial channels. Toward the end of the compression stroke, the gas located in the first chamber 31 is compressed more rapidly than the gas located in the turbulence chamber so that there is generated a gas flow according to the arrow C.

In the second exemplary embodiment, in which the piston 10 may also be embodied as shown in FIG. 2, the turbulence chamber 21 has a substantially oval cross section. The circumferential wall 24' of the turbulence chamber is substantially cylindrical. However, in many cases, it may also be suitable to provide a substantially circular cross section. The opening for the outlet valve 13 according to FIG. 3, is disposed eccentrically with respect to the central axis of the turbulence chamber 21 and the median transverse plane of the turbulence chamber 21 lies parallel to the diametral plane 40 of the cylinder.

The bore 27' for the single spark plug terminates in the corner lying between the cylindrical wall 24' and the top of the turbulence chamber 21 and is located in a region adjacent to the edge 33 of the channel 26". All of the regions of the cylinder head 11 are squeezing surfaces except the turbulence chamber 21, the channel 26" and the shallow first chamber 31.

According to a variant, shown dash-dotted in FIG. 3, the cylinder may be provided with an inlet 34' for fuel-air mixture, located in the turbulence chamber 21 and closable by a second inlet valve 34, and whose cross section is smaller than the cross section of the first inlet valve 12. In that case, the first inlet 25, closable by means of valve 12, can serve for the inlet of pure air, so that all the fuel is inducted through the second inlet valve 34. This results in a particularly complete and rapid combustion of the fuel-air mixture so that the advantages of this engine are still further enhanced.

In some cases, one may also suitably provide that fuel-air mixture flows through both inlets 25, 34' where however, in general, the mixture flowing in through the inlet 34' should be richer than the mixture flowing through the inlet 25.

In the exemplary embodiment shown, the cross section of the channel 26" either decreases or increases in the direction of the turbulence chamber. However, in many cases, it could be suitably provided that this cross section is made approximately constant, and preferably that the height and the width of this channel 26" be approximately constant.

The term "squeezing surfaces" of the cylinder head or of the top of the piston refers to those regions of these parts which lie at the smallest possible distance from one another when the piston is in the top dead center position. This distance is normally only as large as required to prevent contact by the top of the piston with the cylinder head during the operation of the engine.

It is not necessary to provide additional guide channels in addition to the guide channel according to the invention which would originate in the inlet valve and terminate in the turbulence chamber. But the invention is not limited in this regard, so that, if necessary, one or several supplementary channels could be provided within the cylinder head or the top of the piston which would be open in the direction of the top of the piston or the cylinder head and which would lead to the turbulence chamber.

What is claimed is:

1. An internal combustion engine, the combination comprising a cylinder head, an inlet valve and an outlet valve including respective face portions and respective stem portions having respective axes which terminate in spaced relation relative to the bore of a cylinder of the engine, a piston moving in reciprocation in said cylinder, a single chamber at least surrounding said face portion of said outlet valve and lying at least substantially within the extended geometrical surface defined by the path of said piston, and a passage leading from said face portion of said inlet valve to the said chamber surrounding the said outlet valve, so that in said chamber will be created near the end of the compression stroke a substantially single gaseous swirl flow, which is substantially parallel to the area of the piston top opposite said chamber, and further comprising a spark plug disposed in the side wall of said chamber and located in proximity to that side of the terminus of said passage which is nearest to the center of said swirl flow.

2. An internal combustion engine as claimed in claim 1, in which the radius of curvature of said wall is non-constant around the periphery of said chamber.

3. An internal combustion engine as claimed in claim 2, wherein a spark plug extends through the wall of said chamber into said chamber at a point lying between a wall portion having a first radius of curvature where said passage terminates and a contiguous wall portion having a second and smaller radius of curvature.

4. A 4-cycle, externally ignited internal combustion engine comprising:

cylinder means;

cylinder head means attached to said cylinder means;

a piston moving reciprocatingly within said cylinder, thereby defining a combustion chamber of varying geometry;

an overhead intake valve for closing an inlet opening having a valve seat and which admits a substantially homogeneous combustible charge and is the only inlet means for said engine;

a chamber in said cylinder head extending said combustion chamber into said cylinder head, said chamber having a depth of penetration into said cylinder head which is less than the lateral extent of said chamber and said chamber having a continuous curved lateral wall defining said chamber to be substantially a right cylinder;

an overhead exhaust valve whose valve disc defines the vertical extent of said chamber in said cylinder head and whose valve seat lies in a plane which is displaced from the plane which includes the seat of said inlet valve;

and said piston and said cylinder head are disposed to cooperate so that, at top dead center of said piston, said piston head and said inlet valve disc are substantially parallel and so near each other that, during the end of the compression stroke, the top of said piston and said cylinder head cooperate to define a guide channel originating in the vicinity of said inlet valve disc and leading to said chamber and terminating in said chamber in a substantially tangential manner; whereby gaseous charge is accelerated through said guide channel to thereby enter said chamber substantially tangentially and induce therein a substantially unique vortex flow whose axis of rotation is substantially parallel to the longitudinal cylinder axis; said piston and said cylinder head further cooperating in such a manner that, at top dead center, the combustible charge is substantially confined to said chamber and to said guide channel only.

5. An internal combustion engine as claimed in claim 4, in which said chamber has a substantially oval plane section.

6. An internal combustion engine as claimed in claim 4, in which the height of said chamber is substantially constant.

7. An internal combustion engine as claimed in claim 4, in which the radius of curvature of said wall is non-constant around the periphery of said chamber.

8. An internal combustion engine as claimed in claim 4, wherein said wall defines a right cone having an apex angle only slightly greater than zero.

9. An internal combustion engine as claimed in claim 4, wherein said chamber lies at least substantially within the extended geometrical surface defined by the path of said piston.

10. An internal combustion engine as defined by claim 4, further comprising a secondary inlet valve in said chamber which serves for admission of a rich fuel-air mixture.

11. An internal combustion engine as claimed in claim 10, wherein the flow cross section of said secondary inlet valve is smaller than the flow cross section of said main inlet valve.

12. An internal combustion engine as claimed in claim 10, wherein said chamber lies at least substantially within the extended geometrical surface defined by the path of said piston.

13. An internal combustion engine as claimed in claim 10, further comprising a spark plug disposed in the side wall of said chamber and located in proximity to that side of the terminus of said passage which is nearest to the center of said swirl flow.

* * * * *